March 17, 1959     D. A. TREBILCOCK     2,877,945
SHAFT END-PLAY LIMITING BEARING MEANS
Filed Jan. 9, 1956
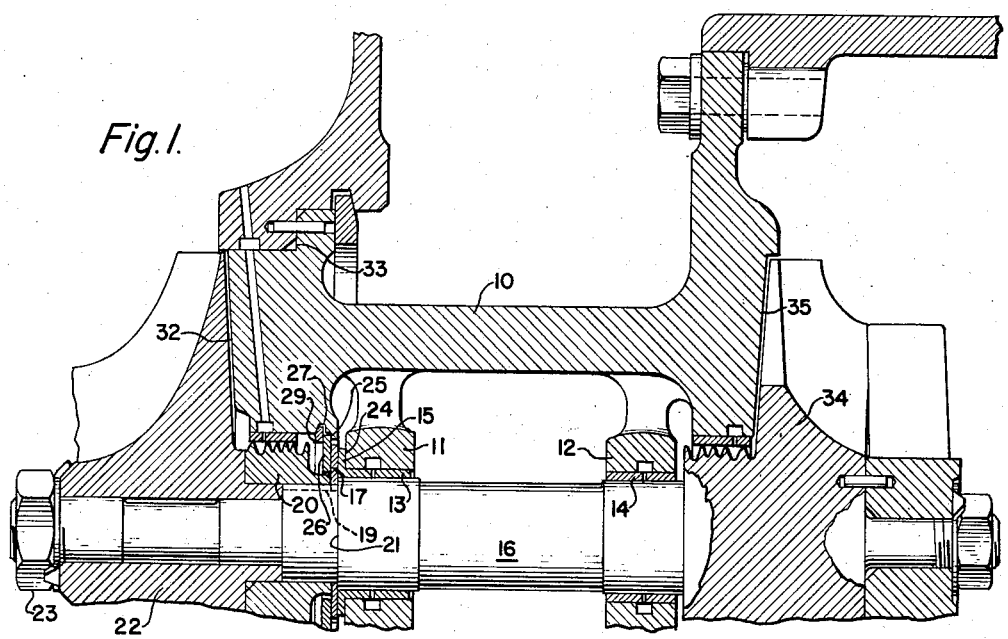
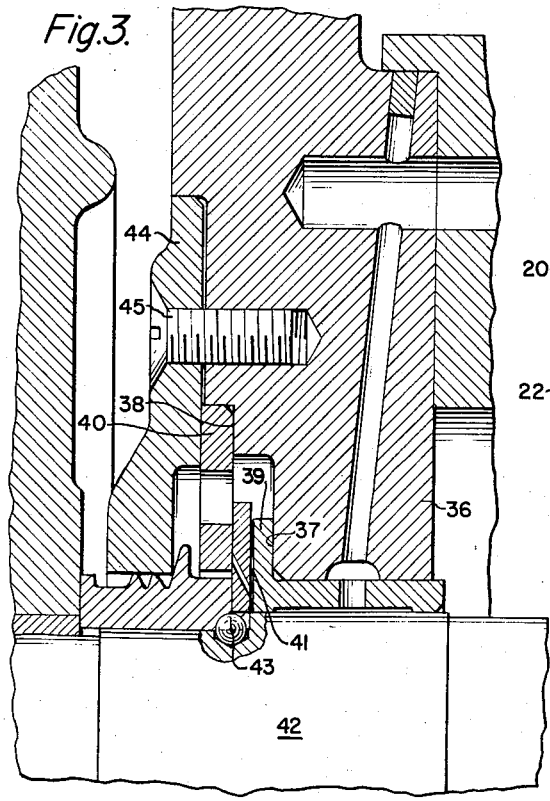
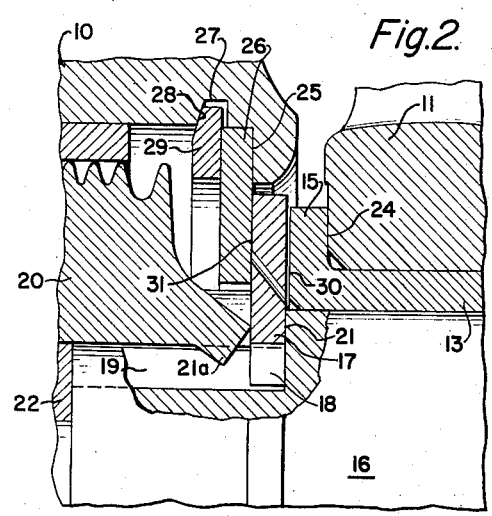
DOUGLAS A. TREBILCOCK,
        INVENTOR.
BY *John H. J. Wallace*

United States Patent Office 2,877,945
Patented Mar. 17, 1959

2,877,945

SHAFT END-PLAY LIMITING BEARING MEANS

Douglas A. Trebilcock, Los Angeles, Calif., assignor to The Garrett Corporation, Los Angeles, Calif., a corporation of California Application January 9, 1956, Serial No. 558,025

5 Claims. (Cl. 230—116)

The present invention relates to a shaft end-play limiting bearing means and more particularly to such a means for use in turbosuperchargers or other machines requiring precise axial location, and end-play control, of their shafts.

Various bearings having precise shaft end-play limiting means are known in the art; however, it has always been difficult to produce such bearings economically, due to the usual accumulation of end-play tolerances which result from slight dimensional variations of individually machined parts of the bearings. Tolerances also accumulate as a result of mounting end-play limiting bearings in a housing.

These difficulties are doubly noticeable in the production of turbosuperchargers, wherein a shaft is subject to limited end-play tolerances while carrying a turbine wheel on one end and an impeller on its other end.

Such machines are inefficient if the wheels thereof are not properly located axially with respect to their closely fitted shrouds. Furthermore, such wheels may rub adjacent shroud structures if end-play of the wheel supporting shaft is not properly limited within a certain precisely located region. It will, therefore, be understood that a turbosupercharger shaft must support a turbine wheel and an impeller precisely within respective shroud clearance regions, and in addition the overall axial play of said wheel and impeller must be limited within the respective regions so that neither side of either the turbine wheel or impeller will rub its respective adjacent shroud structure.

Heretofore, the production and assembly of turbosupercharger end-play limiting bearing parts has been costly due to the unpredictable accumulation of tolerances among a set of parts brought together in the production of an individual turbosupercharger. The expense attendant to such production has been accrued during custom assembly of each set of end-play bearing parts. Such assembly operations involve end-play shimming and measurement of the bearing assemblies, all of which require considerable time of skilled laborers.

It is an object of the present invention to provide a precise shaft end-play limiting bearing means which may be readily and economically machined and assembled in mass production thereof.

Another object of the invention is to provide a precise shaft end-play limiting bearing means which is particularly adapted to economical mass production of turbosuperchargers or other similar machines.

Another object of the invention is to provide a precise shaft end-play limiting bearing means, for which mass production tooling may be readily and easily provided.

Another object of the invention is to provide a precise shaft end-play limiting bearing means which may be readily assembled from a set of production parts without encountering any difficulties in attaining proper axial location of a shaft relative to its supports and wherein overall end-play of the shaft will be within proper limits.

A further object of the invention is to provide a shaft end-play limiting bearing means which will greatly facilitate overhaul and repair of turbosuperchargers and other like machines employing such means.

An additional object of the invention is to provide a shaft end-play limiting bearing means which is very durable in operation and therefore economical to maintain.

The foregoing, together with other objects and advantages, will be apparent from the disclosure afforded by the following specification, appended claims and accompanying drawings in which:

Fig. 1 is a fragmentary axial sectional view of a turbosupercharger having shaft end-play limiting bearing means in accordance with the present invention;

Fig. 2 is a fragmentary sectional view similar to Fig. 1, but showing a portion of the structure on enlarged scale;

Fig. 3 is a fragmentary sectional view of a modified bearing structure according to the invention.

The present invention, as shown in Fig. 1 of the drawings, is embodied in a turbosupercharger having a bearing housing 10 provided with bearing bosses 11 and 12 which retain shaft bearings 13 and 14. The bearing 13 is a combined radial and thrust bearing while the bearing 14 is adapted to withstand radial loading only. The bearing 13 is provided with a flange portion 15 which serves as a thrust bearing member having a running surface normal to the axis of a shaft 16 supported in the bearings 13 and 14. Engaging the thrust bearing flange 15 of the bearing 13 is a thrust bearing member 17 which is fixed to the shaft 16, as shown best in Fig. 2 of the drawing. This thrust bearing member 17 is provided with an antirotational tab 18 which extends into a slot 19 in the shaft 16.

A collar 20 is abutted to the thrust bearing member 17 for holding it in fixed longitudinal position on the shaft and against a shoulder 21. The collar 20 is fixed against rotational movement on the shaft 16 by a tab 21a which is bent inwardly into the slot 19 previous to assembly of the shaft 16 in the bearing housing 10 as shown in Fig. 2 of the drawing. The collar 20 and a compressor impeller 22 are axially retained on the shaft 16 by means of a nut 23 screw threaded thereon. This nut 23, when tightened on the shaft, forces the compressor impeller to abut the collar 20, urging the latter into engagement with the thrust bearing member 17.

The bearing housing 10, adjacent the flange 15 and the bearing 13, is provided with a machined shoulder face 24 which is arranged to retain the thrust bearing flange 15 in precise axial location relative to the bearing housing 10. The bearing housing is provided with a second thrust bearing retaining shoulder face 25 which is machined in precise axially spaced relation to the surface 24. Both shoulder faces 24 and 25 are substantially normal to the axis of the shaft 16 and face in the same direction, i. e., toward the compressor impeller 22.

The shoulder faces 24 and 25 serve as thrust bearing shoulders. The thrust bearing shoulder 25, having a precisely machined face, supports a second thrust bearing member 26 in spaced relation to the thrust bearing flange 15. It will be seen that the inside diameter of the shoulder 25 is larger than the external diameter of the flange 15, permitting the bearing 13 to be removed from the housing internally of the shoulder 25. Axially spaced from the shoulder 25 is a ring groove 27 which is provided with a sidewall 28 disposed at an angle relative to an adjacent side of the bearing member 26. A resilient retaining ring 29 engages the surface 28 in the groove 27 and the thrust bearing member 26 and forces the latter into engagement with the face of the shoulder 25.

The wall 28 is so disposed that the ring 29, as it tends to expand, moves on an incline toward the thrust bearing member 26 whereby the member 26 is constantly forced against the shoulder 25.

It will be seen that the axial spacing of the shoulders 24 and 25 is considerably greater than the thickness of the flange 15, thereby leaving a space between the adjacent thrust bearing surfaces 30 and 31 of the thrust bearings 15 and 26, respectively. The axial dimension of the thrust bearing member 17 is slightly less than the axial space between the surfaces 30 and 31 in order to provide precise running tolerances for the thrust bearing member 17.

Referring to Fig. 1 of the drawing, it will be seen that the housing 10 is provided with a compressor impeller shroud surface 32 which is axially spaced from the shoulders 24 and 25. Positioned outwardly of the shroud surface 32 is a plenum engaging shoulder 33 which may be integral with the bearing housing 10. This shoulder 33 faces in the same direction, axially of the shaft 16, as do the shoulders 24 and 25 and the shroud surface 32. Due to the fact that all of these surfaces are axially spaced and face in the same direction, they may be concurrently machined by a common integral concentric tool whereby numerous housings may all embody the same axially spaced relation of the shoulders 24 and 25, the surface 32 and shoulder 33. Employment of such a production tool permits the manufacture of turbosuperchargers having very precise end-play tolerances and axial location of the turbine and impeller shaft thereof. Thus the assembly of any set of the parts, from production lots, may be made without the necessity of adjustment or custom attention to any individual housing or assembly therein.

As shown in Fig. 1 of the drawings, the shaft 16, on its opposite end from the compressor impeller 22, carries a turbine wheel 34 which runs adjacent to a shroud 35 of the housing 10. Thus, the shaft 16, having rotors on its opposite ends, must be precisely located axially relative to the housing in order to maintain the compressor impeller 22 and turbine wheel 34 in close relation to the shrouds 32 and 35, without rubbing the same. As hereinbefore pointed out, this arrangement of a turbosupercharger must be maintained and it is particularly necessary to limit the end-play of the shaft to do so. It has been a difficult problem to eliminate the accumulation of tolerances in an assembly such as shown in Fig. 1, wherein axial thrust bearings, turbine wheel and impeller shrouds and a multiplicity of parts are axially engaged and connected with each other. As hereinbefore described, the use of a common tool for concurrently machining the shoulders 24 and 25 prevents undue accumulation of tolerances in end-play bearing structures assembled of stock parts. The distance between the shoulders 24 and 25 may be maintained within a very close tolerance, for example, within .0005 of an inch. Thus, when the bearing housing is produced in volume, tolerance errors in the structure which accommodates shaft end-play is minimized. The combined axial dimensions of the end-play bearing members 15 and 17 may easily be maintained within .002 of an inch. In order to operate safely, the compressor impeller 22 and turbine wheel 34 must clear their respective shroud surfaces 32 and 35 with a tolerance of substantially .008 of an inch. Considering the foregoing end-play tolerances which may be maintained in the production of the end-play bearing parts, and also considering fairly liberal tolerances in the machining of the shaft 16 and the collar 20, the compressor impeller 22 and turbine wheel 34 would not be in danger of rubbing the shrouds 32 and 35. The precise shaft location provided by the arrangement of the shoulders 24 and 25 together with the low accumulation of tolerances of the adjacent thrust bearing mechanism provides an assembly, the parts of which may be mass produced and assembled without custom fitting, shimming or measurement. Thus, a turbosupercharger manufactured in accordance with the present invention may be a very precise assembly made without undue employment of skilled labor.

In the modified form of the invention shown in Fig. 3 of the drawing, a bearing housing 36 is provided with shoulders 37 and 38 corresponding to shoulders 24 and 25 disclosed in Figs. 1 and 2 of the drawings. Engaging the shoulders 37 and 38 are axial thrust bearings 39 and 40 intermediate which a thrust bearing 41 operates. The thrust bearing 41 is prevented from rotation with respect to a shaft 42 by means of a ball-shaped key 43 which interlocks the thrust bearing 41 and the shaft 42. The principal difference between the structures, shown in Figs. 1 and 2 of the drawing and the modified structure, resides in a thrust bearing retainer 44 which is fixed to the housing 36 by means of screws 45. The retainer 44 is thus forced to engage the thrust bearing 40 and to maintain it securely engaged with the shoulder 38. It will be seen that the retainer 44 performs a function equivalent to the retainer ring 29 disclosed in Figs. 1 and 2 of the drawings.

Shoulders 37 and 38 corresponding to the shoulders 24 and 25 may also be machined by a common integral tool which is capable of concurrently reaming shaft bearing supports and facing shroud surfaces and plenum shoulders.

It will be noted that in both forms of the invention shown, the first and second thrust members, 15 and 26 in the first form and 39 and 40 in the second form, are flat disk-like elements, the members 15 and 39 being preferably, though not necessarily, formed integral with the bearing member 13 and the corresponding bearing in the second form.

I claim:

1. A shaft end-play limiting bearing means for turbosuperchargers comprising: a shaft having a turbine wheel on one end and an impeller on the other end thereof; a bearing housing surrounding said shaft and having first and second axially spaced bearing shoulders of different diameters both facing in the same direction; shroud means at opposite ends of said housing and spaced at critical distances from said turbine wheel and said impeller; a first thrust bearing member engaging said first shoulder; a second thrust bearing member engaging said second shoulder; means engaging and holding said second thrust bearing member against said second shoulder, the distance between said shoulders being greater than the thickness of said first thrust bearing member whereby said first and second thrust bearing members are spaced from one another; and a third thrust bearing carried by and axially fixed to said shaft, said third thrust bearing member being positioned between said first and second thrust bearing members and having an axial dimension slightly less than that of said space thereby providing for precise limitation of the axial movement of said shaft to maintain the critical spacing of said turbine wheel and said impeller relative to said shroud means.

2. In a shaft end-play limiting bearing means: a shaft; a bearing housing surrounding said shaft and having first and second axially spaced bearing shoulders of different diameters facing in the same direction; a first thrust bearing member engaging said first shoulder; a second thrust bearing member engaging said second shoulder; means engaging and holding said second thrust bearing member against said second shoulder, the distance between said shoulders being greater than the thickness of said first thrust bearing member whereby said first and second thrust bearing members are spaced from one another; a third thrust bearing member carried by and axially fixed to said shaft, said third thrust bearing member being positioned between said first and second thrust bearing members and having an axial dimension slightly less than that of said space, said engaging and holding means having an internal groove in said housing adjacent to said second thrust bearing member, said groove having a wall inclined toward said second thrust bearing member and opposing said second shoulder; and a resilient ring engaging said inclined wall, the resiliency of said ring urging such ring toward said second thrust bearing member to hold it against said second shoulder.

3. In a tubrosupercharger: a shaft having a turbine wheel on one end; a bearing housing surrounding said shaft and having first and second axially spaced bearing shoulders facing in the same direction; a first thrust bearing member engaging said first shoulder; a second thrust bearing member engaging said second shoulder; means engaging and holding said second thrust bearing member against said second shoulder, the distance between and shoulders being greater than the thickness of said first thrust bearing member whereby said first and second thrust bearing members are spaced from one another; a third thrust bearing member carried by and axially fixed to said shaft, said third thrust bearing member being positioned between said first and second thrust bearing members and having an axial dimension slightly less than that of said space, and a wheel shroud surface on said housing axially spaced from said second shoulder and facing the same direction, the bearing members serving to maintain a predetermined spacing between said turbine wheel and said wheel shroud surface.

4. In high speed rotating machinery: a housing having an opening for a shaft extending therethrough, said housing being provided with spaced bearing shoulders of different diameters adjacent one end of said opening, said shoulders facing in the same direction; spaced bearing elements disposed in said opening, one of said bearing elements engaging the smaller diameter shoulder and providing a first thrust bearing face; a shaft disposed for rotation in said bearing elements; rotor means on each end of said shaft, said rotor means being spaced critical distances from said housing; means adjacent one end of the opening for maintaining said critical spacing, said means having a thrust bearing element secured in engagement with the larger diameter bearing shoulder and providing a second thrust bearing face spaced from and opposed to said first thrust bearing face; and a third thrust bearing element secured for rotation with said shaft and against axial movement relative thereto, said third thrust bearing element being disposed in and closely fitting the space between said first and second thrust bearing faces.

5. In high speed rotating machinery: a housing having an opening for a shaft extending therethrough, said housing being provided with spaced bearing shoulders of different diameters adjacent one end of said opening, said shoulders facing in the same direction; spaced bearing elements disposed in said opening, one of said bearing elements having a flange portion engaging the smaller diameter shoulder and providing a first thrust bearing face; a shaft disposed for rotation in said bearing elements; rotor means on each end of said shaft, said rotor means being spaced critical distances from the adjacent portions of said housing; means adjacent one end only of said opening for maintaining said critical spacing, said means having a thrust bearing element secured in engagement with the larger diameter bearing shoulder and providing a second thrust bearing face spaced from and opposed to said first thrust bearing face; a third thrust bearing element disposed in and closely fitting the space between said first and second thrust bearing faces; and means securing said third thrust bearing element for rotary movement with and against axial movement relative to said shaft.

References Cited in the file of this patent

UNITED STATES PATENTS

| | | |
|---|---|---|
| 2,495,169 | Jennings et al. | Jan. 17, 1950 |
| 2,556,020 | Williams | Jan. 5, 1951 |
| 2,577,134 | Land | Dec. 4, 1951 |

UNITED STATES PATENT OFFICE
CERTIFICATE OF CORRECTION

Patent No. 2,877,945　　　　　　　　　　　　　　　　　　March 17, 1959

Douglas A. Trebilcock

It is hereby certified that error appears in the printed specification of the above numbered patent requiring correction and that the said Letters Patent should read as corrected below.

Column 5, line 5, for "tubrosupercharger" read -- turbosupercharger --; line 12, for "between and" read -- between said --.

Signed and sealed this 11th day of August 1959.

(SEAL)

Attest:
KARL H. AXLINE
Attesting Officer

ROBERT C. WATSON
Commissioner of Patents